No. 830,804. PATENTED SEPT. 11, 1906.
W. A. F. SCHOENEBECK.
CLOTHES LINE APPARATUS.
APPLICATION FILED JULY 6, 1905.
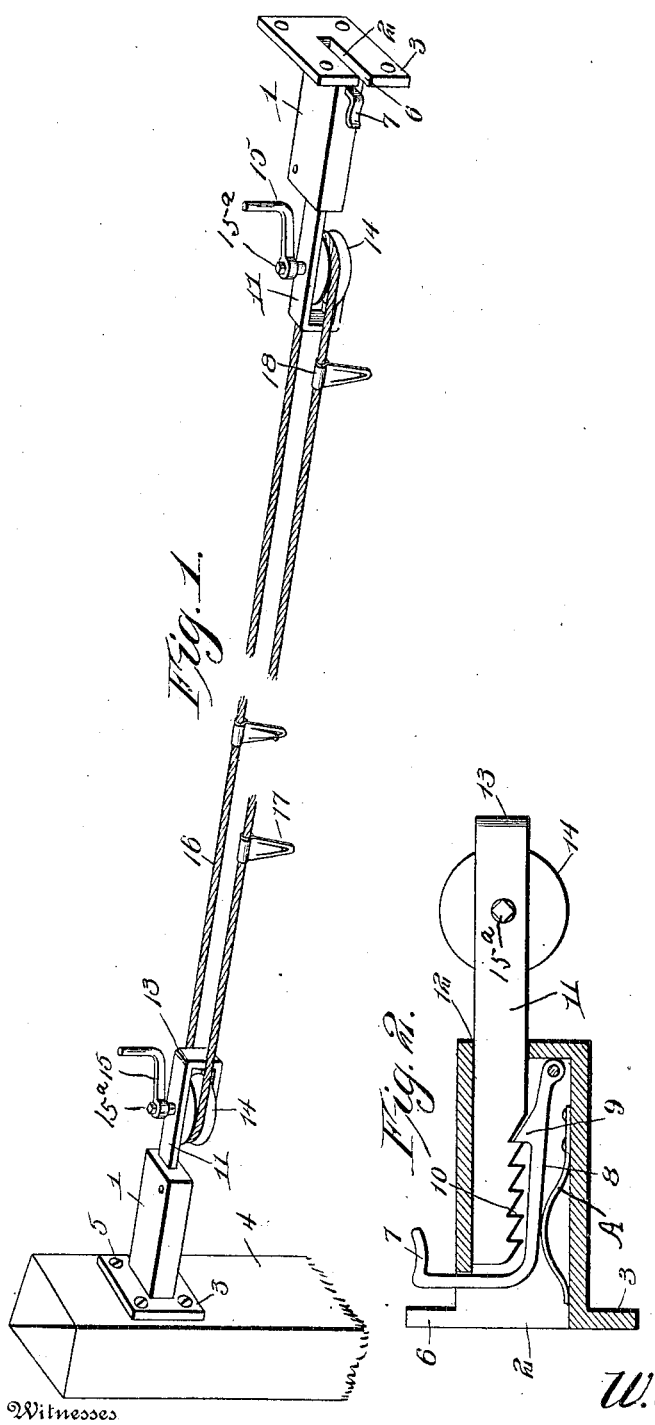

UNITED STATES PATENT OFFICE.

WILLIAM A. F. SCHOENEBECK, OF SVENSEN, OREGON.

CLOTHES-LINE APPARATUS.

No. 830,804.     Specification of Letters Patent.     Patented Sept. 11, 1906.

Application filed July 6, 1905. Serial No. 268,364.

*To all whom it may concern:*

Be it known that I, WILLIAM A. F. SCHOENEBECK, a citizen of the United States, residing at Svensen, in the county of Clatsop and State of Oregon, have invented certain new and useful Improvements in Clothes-Line Apparatus; and I do hereby declare the following to be a full, clear, and exact description of the invention, such as will enable others skilled in the art to which it appertains to make and use the same.

My invention relates to clothes-line apparatus; and its object is to provide an endless line having pins or fasteners of peculiar construction secured thereto.

Another object is to so mount the line that all portions thereof can be utilized for supporting clothes.

Still another object is to provide means whereby the line may be tensioned.

With the above and other objects in view the invention consists of certain novel constructions and combination of parts hereinafter more fully described and claimed.

In the accompanying drawings I have shown the preferred form of my invention.

In said drawings, Figure 1 is a perspective view of my improved clothes-line apparatus. Fig. 2 is an enlarged section through one of the socket-pieces.

Referring to the figures by numerals of reference, 1 is a preferably rectangular socket-piece, the socket being open at its rear end, as shown at 2, and provided with a base-flange 3, adapted to be secured to a post 4 in any suitable manner, as by means of screws 5. The flange 3, as well as one of the walls of the socket-piece, is slotted, as shown at 6, for the reception of a handle 7, formed at one end of a pivoted lever 8, which is provided with a tooth 9. This tooth is adapted to engage any one of a series of teeth 10, formed on a shank 11, which is slidably mounted in an aperture 12, formed in the front end of the socket-piece, and the shank is provided at its outer end with a hook 13, in which is journaled a pulley 14. A crank 15 is connected to the shaft 15ª of the pulley, whereby the same may be readily rotated manually.

As shown in Fig. 1, two of the socket-pieces are utilized, and these may be raised at any desired distance apart. An endless line 16 is mounted upon the two pulleys and is provided with fasteners 17 of novel form, which when the pulleys are rotated will travel therearound and carry with them any clothes or other articles which may be engaged thereby. The tooth 9 on the lever 8 is normally held into engagement with the teeth 10 formed on the shank 11 by means of a spring A, said spring being secured at one end to one wall of the socket-piece and a portion thereof directed against the lever 8, so that when said lever is released after having been depressed to disengage the tooth 9 from the teeth 10 the spring will immediately dispose said tooth on the lever into engagement with the teeth on the shank. After the line 16 has been placed upon the pulleys 14 the same may be tensioned by pressing one of the shanks 11 inward. The tooth 9 on lever 8 may be swung into engagement with any one of the teeth 10 by properly manipulating the handle 7, and after these teeth have been placed in engagement the shank 11 will be held against movement and the line 16 kept under tension. The apparatus is then in condition for use and articles may be fastened to the different fasteners or pins 17. By turning one or both of the cranks 15 the line will be caused to move around the pulleys 14 and will carry the articles connected to the plates 17 therewith. As these fasteners can pass around the pulleys, it is obvious that both sides of the line can be utilized for supporting clothes and that said clothes can be placed upon the line by a person standing adjacent one of the pulleys 14.

Having thus fully described my invention, what I claim as new, and desire to secure by Letters Patent, is—

In a clothes-line-engaging device, a socket-piece having an opening at one end, said opening being at one side of the socket and a slot at the opposite end of said socket, a toothed shank slidably disposed through said opening and extending into the socket, a hook at the outer end of said shank, a pulley journaled in said hook, an L-shaped lever pivotally secured in said housing, a tooth upon said lever adapted to engage the notches in said shank, a handle portion formed at the free end of said lever and extending through said slot, and means to normally hold said tooth in engagement with said toothed shank.

In testimony whereof I have signed my name to this specification in the presence of two subscribing witnesses.

WILLIAM A. F. SCHOENEBECK.

Witnesses:
  A. C. SCHOENEBECK,
  A. KRANKENHAGEN.